May 25, 1965    TATSUO TANOUE    3,185,220
PLOW DEVICE
Filed Dec. 16, 1963    2 Sheets-Sheet 1
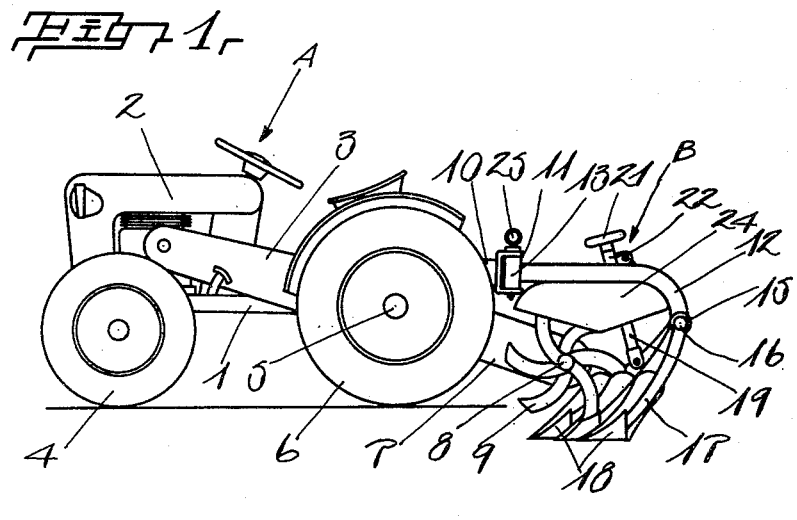
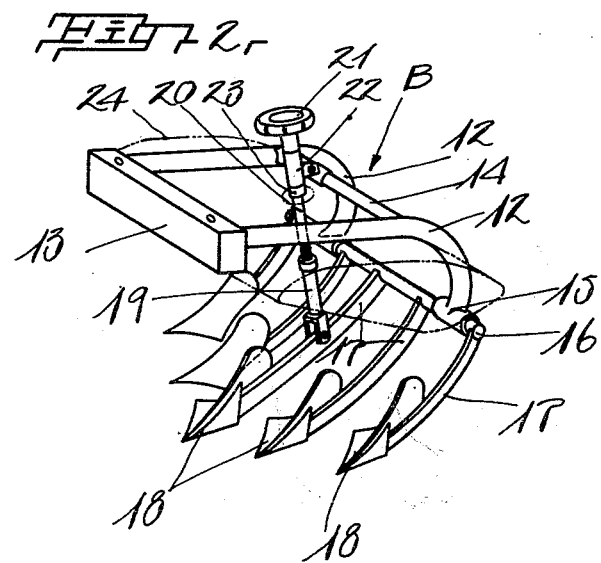

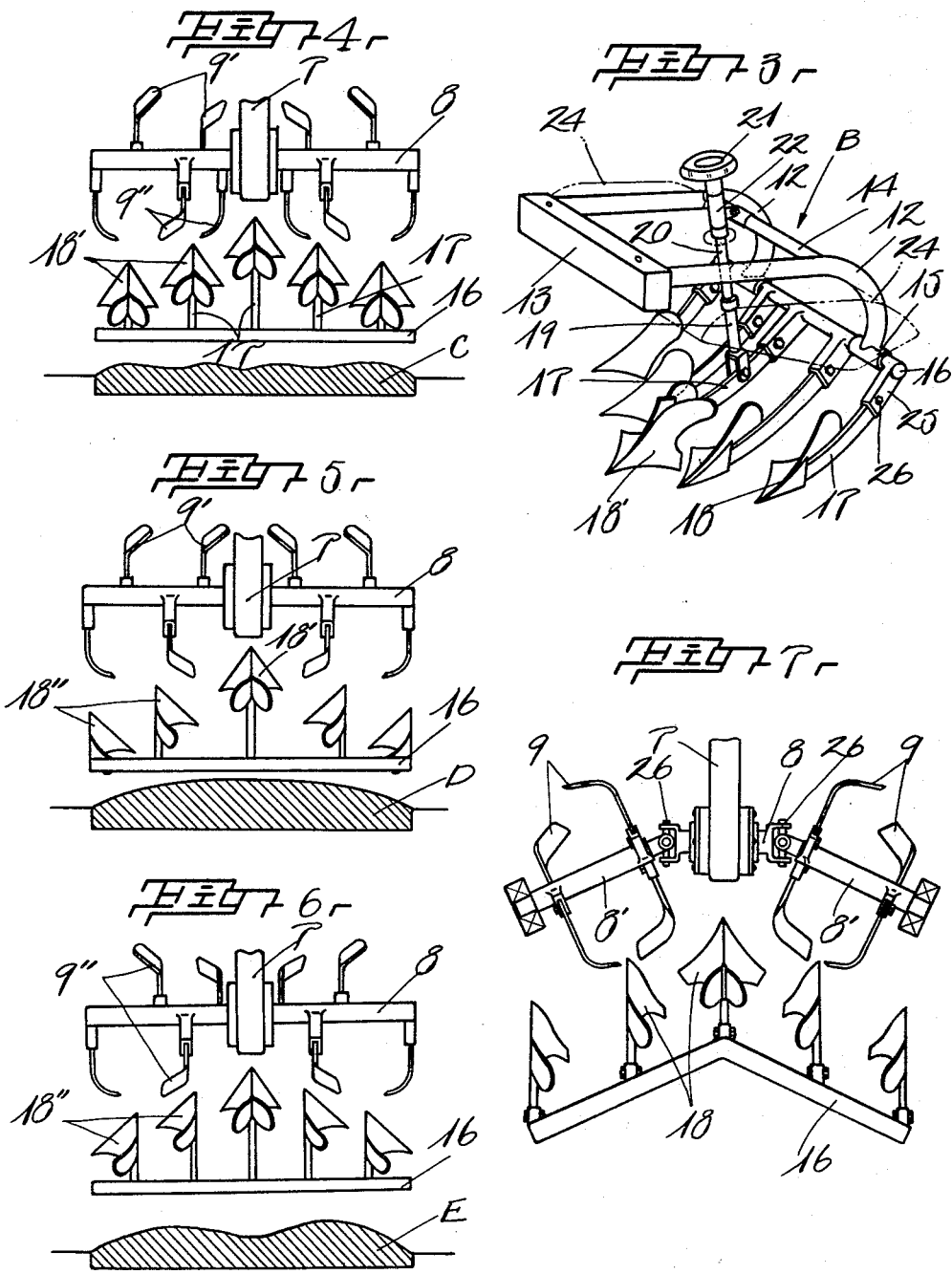

United States Patent Office 3,185,220
Patented May 25, 1965

3,185,220
PLOW DEVICE
Tatsuo Tanoue, 2222 Oaza, Nakafuri,
Hirakata-shi, Osaka, Japan
Filed Dec. 16, 1963, Ser. No. 330,681
6 Claims. (Cl. 172—66)

This invention relates to agricultural equipment used for cultivation of farm or land, and more particularly to a plow device attached to the rear of a power cultivator such as tractor or the like in combination with a rotary cultivating member having a plurality of blades, said plow device having a plurality of moldboard-plows positioned side by side in a stepped formation similar to that of a flight of wild-geese, said plow device being placed to the rear of the rotary cultivating member, and each of the moldboard-plows of the plow being positioned alternately with the blades of the rotary cultivating member.

In the operation of the tractor, which is considered as one of the most readily available power cultivators, it has heretofore been customary to use a plow separately and independently from a rotary cultivating member. The function of the plow is different from that of the rotary cultivating member and each of the devices have heretofore been attached to the trailer separately. Thus, by the known operation, the soil is first plowed and then the plow is exchanged for a disc harrow or the like which breaks the plowed soil. This operation is, however, not only inefficient, but also ineffective in the cultivating operation of the soil. Therefore, in order to increase the efficiency and the effectiveness of the operation, it is necessary to attach a rotary cultivating member, in addition to the plow member, to the same power cultivator as that of the plow so that plowing, breaking and reversing of the soil may be attained simultaneously. But it is impossible to obtain desirable action and effect by arranging those members without a specific consideration of the technical means.

In order to meet said requirement, the inventor has discovered a novel plow device having a plurality of moldboard-plows arranged side by side like a flight of wild-geese, placed to the rear of the rotary cultivating member in such a manner that each moldboard-plow of the plow is positioned alternately with the blades of the rotary cultivating member.

It is, therefore, one object of the present invention to provide a plow device which reduces the resistance and increases the speed of the cultivating operation of the soil with the help of a rotary cultivating member specifically arranged in front of the plow, thereby increasing the efficiency of the cultivating operation.

It is another object of the present invention to provide a plow device which is capable of simultaneously performing different works for cultivation of the soil, such as plowing, breaking, and reversing, with the help of the rotary cultivating member.

It is a further object of the present invention to provide a plow device which is capable of digging the soil deeper and wider than prior plows with the help of the rotary cultivating member specifically arranged in front of the plow.

Other objects and advantages of the present invention will become apparent from the following description, in conjunction with the annexed drawings, in which preferred embodiments of the invention are disclosed. In the drawings:

FIG. 1 is a side view of a tractor provided with the plow device in the rear thereof and a rotary cultivating member arranged in front of the plow device;

FIG. 2 is a perspective view of the plow device having a plurality of moldboard-plows and their supporter members;

FIG. 3 is a perspective view of another form of embodiment of the present invention;

FIG. 4 is an illustrative view of the combination of the plow and the rotary cultivating member, illustrating the form of the soil cultivated by said combination, said plow being provided with a plurality of moldboard-plows, each of which comprises symmetrically projected moldboards.

FIG. 5 is an illustrative view similar to that of FIG. 4, in which the modified moldboard-plows of the plow and the resultant form of the soil are shown;

FIG. 6 is another illustrative view similar to FIG. 5, showing another modified moldboard-plow formation;

FIG. 7 is an illustrative view of the combination of the plow and the rotary cultivating member, in which the rotary blade and the moldboard-plow securing members are angularly bent.

In FIGS. 1 and 2, A is a farm tractor (8–12 H.P.) wherein 1 is the basic frame, 2 is a motor equipped on the front end of the frame 1; 3 is a mission case, longitudinally fixed on the side of the frame 1; 4 is the front wheel, placed under the front of the frame 1; 5 is the driving shaft mounted in the rear of the mission case 3, and, through the transmission gear in the mission case 3 is connected the rotary shaft of the motor 2. The rear wheels are attached to both ends of driving shaft 5. Element 7 is the transmission gear case which projects rearwardly from the center of the mission case 3 and in which the rotary shaft 8 is rotatably mounted, said rotary shaft 8 being connected to the driving shaft through said mission gear in the mission case 3. Elements 9 are the rotary blades, each of which is fixedly mounted on the rotary shaft 8 at suitable spaces. Element 10 is the pulling rod, connected at its front end to the frame 1 and at its rear end to the hitched metal 11. The cross-section thereof is channel shaped and has several pin receiving holes for connecting the plow B to said pulling rod 10. B indicates a plow device embodying the present invention. 12 indicates a pair of plow beams which are suitably curved inwardly, and are arranged symmetrically, and the front ends of which are fixed to the connecting member 13 which is, in turn, fitted in the hitched metal 11. The plowbeams 12 are connected by a cross girder 14 at the middle portions thereof. 15 is a shaft-pass pipe, both ends of which are fixed at a right angle to the lower end of the plowbeams 12 and have a shaft member 16 rotatably inserted therein. Moldboard-plow supporting arms 17 which are arranged side by side like a flight of wild-geese are each fixed to said shaft member 16. Each lower end of said supporting arms 17 has a moldboard-plow of the plow integrally formed therewith. Each of said moldboard-plows has two moldboards 18 inwardly twisted. Connecting rod 19 has its lower end forked and its upper end internally threaded, wherein the lower end is fixed onto the middle supporting rod 17. Adjusting rod 20 has a handle 21 at its upper end and a threaded part at its lower end. Through the collar 22, fixed in the center of cross girder 14, the threaded part of the lower end is connected to the female part of the connecting rod 19. The adjusting rod 20 is held loosely by the collar. 24 is a mud guard attached to the plowbeams 12. To attach the plow device B to the tractor, pins 25 are inserted into the holes made in the upper and lower pieces of the hitchmetal 11 for engaging the connecting member 13 with the pulling rod 10, in order that each of the moldboard-plows 18 of the plow is positioned alternately with and under the blades 9 of the rotary cultivating member.

FIG. 3 illustrates a modification of the form of embodiment of the plow device B shown in FIG. 2. As shown in FIG. 3, the supporting rods are dismantably fixed to the receptacle members 25 which project from the shaft member 16, with bolts 26 or the like, enabling them to be exchanged for repair. At the same time, the central moldboard-plow of the plow has two moldboards, 13'.

FIGS. 4, 5 and 6 respectively show different embodiments of the plow combined with different rotary cultivating member as examples.

FIG. 4 shows that the blades of the rotary cultivating member facing inward 9' are lined up and those facing outward 9", are also lined up on the rotary shaft 8. On the other hand, the moldboards 18' of the plow are arranged alternately therewith, and with such an arrangement, the soil may be cultivated in the form as shown in FIG. 4 at C.

FIG. 5 shows that all the blades 9' of the rotary cultivating member are faced inwardly, and the plow combined therewith also has its moldboards faced inwardly, except the central one, and the results obtained by such an arrangement will be as FIG. 5 at D.

FIG. 6 illustrates that all the blades 9" of the rotary cultivating member except the outer ones are faced outwardly, and the moldboards of the plow, similiarly has each moldboard faced outwardly, and that such form of the cultivated soil as shown in FIG. 6 at E may be obtained.

As may be clearly understood from each drawing, it is possible to cultivate soil according to an object as predetermined with the corresponding arrangement of the blades of the rotary cultivating member and the moldboards of the plow.

FIG. 7 illustrates an arrangement and construction different from those described formerly. The rotary shaft 8 and shaft rod 16 which appeared in the foregoing description were, in all cases, linearly formed, while, in this embodiment, the rotary shafts 8' are slanted by means of the universal joints 26, said rotary shafts having a rotary blades 9. The shaft rod 16 is bent in parallel to shafts 8 and to it are attached the moldboard-plows. By this arrangement, the length of each arm 17 can be equal, while in those arrangements given in FIGS. 1–6 it is necessary to have the supporting arms 17 formed of different lengths, viz. the central arm is the longest and the others are gradually shortened according to their position. Accordingly, this arrangement affords considerable convenience in manufacture since the supporting arms may be interchanged.

In each form of embodiment of the present invention illustrated in the drawings there is provided five moldboard-plows, which were given only as examples. The number of the moldboard-plows is not so restricted, however, since the number can be either increased or reduced when necessary.

It is also apparent that formation and arrangement of the rotary blades and moldboard-plows are not limited to those shown in FIGS. 4–7, and the other arrangements may be made.

The plows illustrated in FIG. 1 and FIG. 2 are operated as follows: Start the motor 2 and rotate the rotary blades 9 counterclockwise by transmitting the power to the rotary shaft 8 and next let the tractor A advance on the farm. Then the rotary blades 9 are to be pushed into soil to break it up. However, before the soil is broken by the rotary blades 9, the soil is first dug up with the moldboard-plows 18 according to the present invention. This result is obtained because the plow has its moldboard-plows arranged side by side like a flight of wildgeese behind and downwardly of said rotary blades and is pulled together with the rotary blades as the tractor A advances. At the instance when soil is dug and raised up by the plow, the rotary blades 9 smash and throw the soil rearward; and soil plowed by the plow is pulverized further by the rotary blade 9 with the combined action of these two members. In this case, the form of cross section of soil plowed is changed by each of the aforementioned forms of the combination of the rotary blades 9 and moldboards 18. For instance, as shown in FIG. 4, if the moldboard-plows of the plow are made both open right and left, and rotary blades 9', 9" are oppositely directed, approximately uniform thickness of soil layer C may be obtained. In FIG. 5, the moldboard plows 18" turn soil inwardly. Similarly, soil is largely crushed and collected toward inside by the rotary blades 9' which are arranged inwardly also; and as indicated by D the top of the middle portion of the plowed soil is made high. In accordance with the combination of the moldboards 18' and 18" and the rotary blades 9" as shown in FIG. 6, soil is divided right and left by the central moldboard-plow 18' and outwardly by the outwardly directed moldboards 18" so that with the help of blades 9" the soil is formed low at the center and high at both sides as shown in E.

Further, if the foregoing combined operation is examined as to the position of each moldboard-plow, the central, foremost projected one digs up soil and turns it over to the right and left, and the rotary blades then cut into the soil. The moldboard-plows to the right and left of the central one digs and raises soil which has been cut by the rotary blades 9. The outwardly directed moldboard adjacent the central moldboards then turn over soil to the next set of blades 9 and from there to the next set of moldboards. As an entire operation, it is clear that action of the moldboard-plows to dig and turn over the soil and the cutting by the rotary blades are effected almost simultaneously. Again, as shown in FIG. 7, in case when both shaft rod 16 and rotary shaft 8' are slanted, it is different from those cases of FIG. 1–FIG. 6, and each moldboard 18 and each rotary blade 9 come in contact with soil in same instance and work, and soil raised by the moldboards 18 is crushed by the rotary blade 9 altogether; the differences among those actions are only comparable and substantially the same. The combinations shown in FIG. 1–FIG. 6 are suitable for relatively narrow width of cultivation, on the other hand, the combination shown in FIG. 7 is rather suitable for wide width cultivation.

As it is already made clear by each practical example, the present invention is advantageous in that synthetic action effected by the combination of two different cultivating members enables one to cultivate soil deeply and finely. It is impossible, however, to obtain such advantages by merely arranging those members without considering their positions.

Only with those arrangements as described above can such advantages as mentioned above be obtained. According to the present invention, soil is raised from the ground surface by the digging action of each moldboard of the plow and in the same instance turned over and crushed by the rotary blade 9, and by the rotating action, thrown rearwardly. Therefore the resistance caused by the advance of the moldboards is decreased remarkably.

Further, since the rotary blades 9 cut into the soil which has already been plowed by the moldboards 18, the resistance of soil coming against the rotary blades 9 is also decreased. Thus, efficient, effective cultivation is obtained by the combined operation of both members. Furthermore, the advance of the combined members is made much easier than that of single plow. In cooperation with the rotary blades 9, the resistance of soil against the moldboards 18 is decreased and the rotary blades, which rotate in the same direction as the wheels, assist the advance of the plow B. Thus, even a motor of relatively small horse power 2 can pull the members. Accordingly, if the motor of same horse power is used, it is possible to obtain higher efficiency. Thus, according to the present invention, plowing and the pulverization of soil are accomplished simultaneously. Further, the rotary cultivating members illustrated in the drawings are of the central driving type but they can be of a side driving type.

Various modes of carrying out the invention are contemplated as being within the scope of the following claims which particularly point out and distinctly claim the subject matter which is regarded as the invention.

What is claimed:

1. A plow device comprising: a plowbeam, a shaft rod connected to said plowbeam, a plurality of moldboard-plows, supporting arms connecting said moldboard-plows to said shaft rod, said moldboard-plows arranged with the central moldboard-plows positioned foremost and the front ends of the remaining moldboard-plows arranged progressively to the rear of the central moldboard-plow forming a V with the central moldboard-plow at the center of the V, the central moldboard-plow having mounted thereon a first moldboard facing to one side and a second moldboard facing to the opposite side, the remaining moldboard-plows having mounted thereon at least one moldboard facing away from the central moldboard-plow, a rotary cultivating member forward of said moldboard-plows having a plurality of rotary blades mounted thereon, at least one rotary blade adjacent each moldboard in the direction which the moldboards face, the rotary blades adjacent the outer moldboards being angularly bent in a direction opposite from that direction which their adjacent moldboard faces, the remaining of said rotary blades adjacent said moldboards being angularly bent in the same direction as that which their adjacent moldboards face, the rotary blades adjacent the moldboards of the central moldboard-plow extending rearwardly during a portion of their rotary movement to a point rearward of the front end of the central moldboard-plow.

2. A plow device as set forth in claim 1 in which the moldboard-plows other than the central moldboard plow each have mounted thereon two moldboards, one facing to one side and the other facing to the other side.

3. A plow device as set forth in claim 1 in which all the moldboards face in a direction away from the central moldboard-plow.

4. A plow device as claimed in claim 1 in which said share and blade supporting arms are detachably mounted to said shaft rod.

5. A plow device as claimed in claim 1 in which said shaft supporting rod is angularly bent.

6. A plow device comprising: a plowbeam, a shaft rod connected to said plowbeam, a plurality of moldboard-plows, supporting arms connecting said moldboard-plows to said shaft rod, said moldboard-plows arranged with the central moldboard-plow positioned foremost and the front ends of the remaining moldboard-plows arranged progressively to the rear of the central moldboard-plow forming a V with the central moldboard-plow at the center of the V, the central moldboard-plow having mounted thereon a first moldboard facing to one side and a second moldboard facing to the opposite side, the remaining moldboard-plows having mounted thereon at least one moldboard facing away from the central moldboard-plow, a rotary cultivating member forward of said moldboard-plows having a plurality of rotary blades mounted thereon, at least one rotary blade adjacent each moldboard in the direction which the moldboards face, the rotary blades adjacent the outer moldboards being angularly bent in a direction opposite from that direction which their adjacent moldboard faces, the remaining of said rotary blades adjacent said moldboards being angularly bent in the same direction as that which their adjacent moldboards face, the rotary blades adjacent the moldboards of the central moldboard-plow extending rearwardly during a portion of their rotary movement to a point rearward of the front end of the central moldboard-plow, whereby the digging operation of the moldboard-plows cooperates with the cutting operation of the rotary blades so that the two operations are performed on the soil almost simultaneously.

References Cited by the Examiner

UNITED STATES PATENTS

| | | | |
|---|---|---|---|
| 229,505 | 6/80 | Weatherford | 172—65 |
| 285,318 | 9/83 | Stacy | 172—159 |
| 499,211 | 6/93 | Carrothers | 172—71 |
| 1,225,268 | 5/17 | Paterson | 172—71 |
| 1,431,815 | 10/22 | Kanke | 172—178 |
| 1,484,318 | 2/24 | Barnhart | 172—504 |
| 1,717,379 | 6/29 | Garvin | 172—196 |
| 1,880,113 | 9/32 | Smith | 172—65 |
| 2,362,867 | 11/44 | Ulrich | 172—159 X |
| 2,943,687 | 7/60 | Merry et al. | 172—123 |

FOREIGN PATENTS

| | | |
|---|---|---|
| 118,351 | 4/44 | Australia. |
| 597,224 | 8/25 | France. |
| 178,718 | 11/06 | Germany. |
| 530,403 | 7/55 | Italy. |

ABRAHAM G. STONE, *Primary Examiner.*